(12) United States Patent
Selvam

(10) Patent No.: US 8,499,295 B2
(45) Date of Patent: Jul. 30, 2013

(54) MICROCONTROLLER FIRMWARE RUNNING FROM RAM AND APPLICATIONS OF THE SAME

(75) Inventor: Jothiram Selvam, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 351 days.

(21) Appl. No.: 12/886,285

(22) Filed: Sep. 20, 2010

(65) Prior Publication Data

US 2012/0072897 A1  Mar. 22, 2012

(51) Int. Cl.
*G06F 9/44* (2006.01)
(52) U.S. Cl.
USPC ............ 717/168; 717/169; 717/172; 717/173
(58) Field of Classification Search
USPC .................. 717/168, 169, 172, 173; 713/2, 1, 713/100
See application file for complete search history.

(56) References Cited

U.S. PATENT DOCUMENTS 7,089,414 B2 *  8/2006  Langford et al. ............. 717/168

* cited by examiner

*Primary Examiner* — Qamrun Nahar
(74) *Attorney, Agent, or Firm* — Morris Manning & Martin, LLP; Tim Tingkang Xia, Esq.

(57) ABSTRACT

In one aspect, the present invention relates to a system memory device for a computer system having a processor and a firmware. In one embodiment, the system memory device has a RAM, and a ROM with stored boot block data and operational code data, the boot block data containing computer-executable instructions for initializing the firmware, determining if the operational code data is valid, and if the operational code data is valid, copying the operational code data from the ROM to the RAM, where the operational code data contains computer-executable instructions for enabling a plurality of different interfaces to receive a firmware update from a firmware update provider, and if the operational code data is not valid, causing a particular one of the plurality of enabled interfaces to wait for an available firmware update and, when a firmware update is available, receiving the firmware update.

34 Claims, 4 Drawing Sheets

MICROCONTROLLER FIRMWARE RUNNING FROM RAM AND APPLICATIONS OF THE SAME

FIELD OF THE INVENTION

The present invention generally relates to firmware, and more particularly to updating firmware in a computer system having a system memory.

BACKGROUND OF THE INVENTION

A processor of a computer system utilizes firmware, such as a basic input/output system (BIOS), to start the initial operation of the computer system once it is powered on. During the booting process, the BIOS is operative to manage data flow between an operating system and attached devices. The BIOS is made accessible to the processor on a read-only memory (ROM) such as an erasable programmable read-only memory chip (EPROM). When a computer system is powered on, a processor passes control to the BIOS program, which subsequently loads an operating system or at least key parts of an operating system into random-access memory (RAM), such as from a hard disk drive. The BIOS may store boot block recovery code for determining if firmware is invalid and interrupting the boot operations if the firmware is invalid.

Firmware running in an embedded microcontroller can be divided into two parts: an image having a boot block and an image with operational code having fixed addresses to run from ROM. In operation, boot block code that is implemented to initialize the firmware validates the operational code and then gives control to valid operational code. If the operational code is invalid, a polling method is used to wait for a firmware update (which also may be referred to hereinafter as a "firmware upgrade") through a single interface. That is, current firmware can only reliably support one interface for polling. During a typical firmware upgrade, an update tool will request through a command to start the firmware update, which will store a signature in the RAM, and then reset the chip. When reset, the microcontroller will start execution from the boot block and the boot block will identify that the reset has occurred due to a request for firmware upgrade and then proceed directly into the polling method to wait for a firmware update.

In existing conventional microcontroller firmware running from random-access memory (RAM), a compiler may not be able to generate re-locatable binary code. In such a configuration, only one image can be used, which has both a boot block and operational code that can only be run from read-only memory (ROM). The operational code running in ROM may not be operational to flash the ROM during its execution.

In the above-described conventional implementation, a firmware update can only be supported over one interface, as the polling method may not be effective and reliable over more than one interface. Furthermore, a reset is required prior to a firmware upgrade, in order to set the signature in the RAM and reset from the operational code to the boot block.

Therefore, a heretofore unaddressed need still exists in the art to address the aforementioned deficiencies and inadequacies.

SUMMARY OF THE INVENTION

In one aspect, the present invention relates to a microcontroller running a firmware. In one embodiment of the present invention, an embedded controller such as a baseboard management controller (BMC) runs a firmware that is split into two parts, namely a boot block having a fixed ROM address and operational code for running the firmware and having a fixed RAM address. Operational code from the boot block is validated and then the operational code is copied from ROM to RAM, and then control of operations is passed over to the operational code. Thereby, when a firmware upgrade is to be performed, a reset is not required prior to the firmware upgrade process. Because the operational code is running in RAM, more than one interface can be supported in interrupt mode and the boot block running in the ROM can also be updated.

In another aspect, the present invention relates to a system memory device for a computer system having a processor and a firmware. In one embodiment, the system memory of the computer system includes a random-access memory a read-only memory (ROM), where the ROM stores boot block data and operational code data. The boot block data contains computer-executable instructions which, when executed by the processor of the computer system, perform functions that include initializing the firmware and then determining if the operational code is valid. The functions also include copying the operational code from the ROM to the RAM, if it is determined that the operational code is valid. The operational code data includes computer-executable instructions which, when executed by the processor, perform functions that include enabling a plurality of different interface platforms, such as KCS, LAN, and IPMB to receive a firmware update from a firmware update provider.

If, according to the functions executed by the operational code from the boot block data, it is determined that the operational code is not valid, the functions further include causing a particular one of the plurality of enabled interface platforms to wait for an available firmware update and, when a firmware update is available, receiving the firmware update from the firmware update provider. In one embodiment, the firmware update includes at least one of updated boot block data or updated operational code data. If the operational code data is not valid and a firmware update has been received, the functions further include determining if the received firmware update is valid. If it is determined that the received firmware update is valid, the functions further include writing the firmware update to the ROM and then resetting the firmware.

Writing the firmware update to ROM includes determining if the received firmware update includes updated boot block data and/or updated operational code data and, if the received firmware update has updated boot block data, writing the updated boot block data to the ROM such as to replace the prior boot block data. The function of writing the firmware update to the ROM also includes, if the received firmware update has updated operational code data, writing the updated operational code data to the ROM such as to replace the prior operational code data.

In one embodiment, the operational code data is configured to be executable by the processor only from the RAM and the boot block data is configured to be executable by the processor code only from the ROM. This allows for the ROM to be updated during run-time, while also supporting various interfaces through which the firmware update can be performed.

In one embodiment, the system memory device is coupled to a network and is operative to receive the firmware update via the network. The computer system also includes a network interface coupled to the network and coupled to the system memory device. The network interface is operative to receive the firmware update from the firmware update provider via the network. The network interface is further operative to send the received firmware update to the system memory device. In this embodiment, the particular one of the plurality of enabled interface platforms corresponds to the network interface, and the functions performed according to the computer-executable instructions of the boot block data further include causing the particular interface platform to receive the firmware update sent from the network interface.

In one embodiment, the computer system also includes a mass storage device having a stored operating system and a stored network application. The mass storage device is connected to the network interface. The computer system further includes an input-output controller and a display device, where the input-output controller is coupled to the mass storage device and the display device.

In yet another aspect, the present invention relates to a computer system having a processor, a system memory, and a firmware. In one embodiment, the system memory includes a RAM and a flash memory having a stored firmware image with a boot block image in a first memory location and an operational code image in a second memory location. The boot block image contains computer-executable instructions which, when executed by the processor, perform functions that include initializing the firmware, determining if the operational code image is valid, and if the operational code image is valid, copying the operational code image from the flash memory to the RAM. The functions further include, if it is determined that the operational code image is not valid, waiting for an available firmware update image and, when a firmware update image is available, receiving the firmware update image from a firmware update image provider. In one embodiment, the firmware update image contains an updated boot block image and/or an updated operational code image.

The functions performed according to the instructions stored on the boot block image further include, if the operational code image is not valid and a firmware update image has been received, determining whether the received firmware update image is valid. If the received firmware update image is valid, the functions further include flashing the firmware update image to the flash memory such as to replace the prior firmware image.

In one embodiment, the function of flashing the firmware update image includes determining if the received firmware update image has an updated boot block image and/or an updated operational code image. If it is determined that the received firmware update image has an updated boot block image, the functions also include flashing the updated boot block image to the flash memory such as to replace the prior boot block image stored in the first memory location. If it is determined that the received firmware update image has an updated operational code image, the functions further include flashing the updated operational code image to the flash memory such as to replace the prior operational code image stored in the second memory location. The functions performed also include, if the received firmware update image has an updated boot block image but not an operational code image, resetting the firmware after the updated boot block image is flashed.

In one embodiment, the operational code image is configured to be executable by the processor only from the RAM and the boot block image is configured to be executable by the processor only from the flash memory. This allows for the ROM to be updated during run-time, while also supporting various interfaces through which the firmware update can be performed.

In one embodiment, the computer system is connected to a network and is operative to receive the firmware update image via the network.

In yet another aspect, the present invention relates to a computer-implemented method for updating a firmware within a computer system having a system memory device and a processor. In one embodiment, the method includes the steps of initializing the firmware, determining if an operational code data is valid, where the operational code data is stored in a ROM within the system memory device, and if the operational code data is valid, copying the operational code data from the ROM to a RAM within the system memory. The operational code data is operative to enable a plurality of different interface platforms to receive a firmware update from a firmware update provider. The computer implemented method also includes the steps of, if the operational code data is not valid, waiting for an available firmware update and, when a firmware update is available, receiving the firmware update from the firmware update provider. If the operational code data is not valid and a firmware update has been received, the computer-implemented method further includes the step of determining if the received firmware update is valid and, if the received firmware update is valid, writing the firmware update to the ROM.

In one embodiment, the step of writing the firmware update to the ROM includes the steps of determining if the received firmware update has updated boot block data, and if the received firmware update has updated boot block data, writing the updated boot block data to the ROM such as to replace the prior boot block data, and also includes the steps of determining if the received firmware update has updated operational code data and, if the received firmware update has updated operational code data, writing the updated operational code data to the ROM such as to replace the prior operational code data. The step of writing the firmware update to the ROM also includes the step of, if the firmware update includes updated boot block data but the firmware update does not include updated operational code data, resetting the firmware after the updated boot block data is written to the ROM.

In one embodiment, the operational code data is configured to be executable by the processor only from the RAM and the boot block data is configured to be executable by the processor only from the ROM. In operation, this allows for the ROM to be updated during run-time, while also supporting various interfaces through which the firmware update can be performed.

In yet another aspect, the present invention relates to a computer-readable medium having stored computer-executable instructions which, when executed by a processor, perform functions for updating a firmware within a computer system having a system memory device. In one embodiment, the functions include initializing the firmware and determining if operational code data is valid. The operational code data is stored in a ROM within the system memory device. The functions also include, if the operational code data is determined to be valid, copying the operational code data from the ROM to a RAM within the system memory where the operational code data is operative to enable a plurality of different interface platforms to receive a firmware update from a firmware update provider. The functions also include, if it is determined that the operational code data is not valid, waiting for an available firmware update and, when a firmware update is available, receiving the firmware update from the firmware update provider.

In one embodiment, the functions further include, if the operational code data is not valid and a firmware update has been received, determining if the received firmware update is valid, and, if the received firmware update is valid, writing the firmware update to the ROM. The function of writing the firmware update to the ROM includes determining if the received firmware update contains updated boot block data and, if the received firmware update contains updated boot block data, writing the updated boot block data to the ROM such as to replace the prior boot block data. The function of writing the firmware update to the ROM also includes determining if the received firmware update includes updated operational code data and, if the received firmware update includes updated operational code data, writing the updated operational code data to the ROM such as to replace the prior operational code data. The function of writing the firmware update to the ROM also includes, if the firmware update includes updated boot block data and the firmware update does not include updated operational code data, resetting the firmware after the updated boot block data is written to the ROM.

In one embodiment, the operational code image is configured to be executable by the processor only from the RAM and the boot block image is configured to be executable by the processor only from the ROM. In operation, this allows for the ROM to be updated during run-time, while also supporting various interfaces through which the firmware update can be performed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
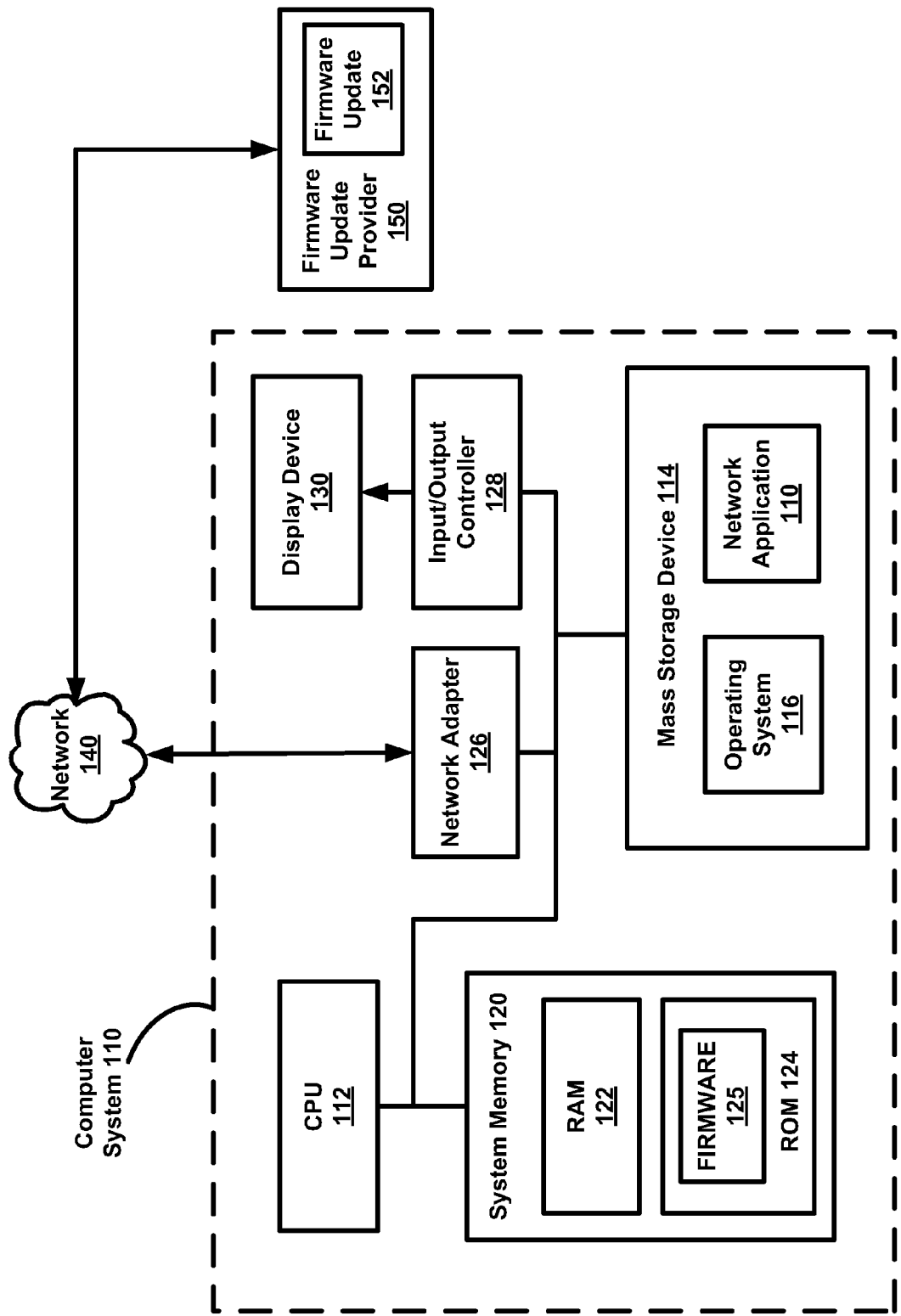
FIG. 1 shows schematically a computer system having a processor, a firmware, and a system memory device for updating the firmware, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1, 2, 3A, and 3B.

Now referring to FIG. 1, in one aspect the present invention relates to a system memory device 120 for a computer system 110 having a processor 112 and a firmware 125. The firmware 125 shown in FIG. 1 may be the BIOS for the computer system 110. Although the computer system 110 shown in FIG. 1 is directed to the context of a personal computer or server computer, those skilled in the art will appreciate that aspects of the present invention may also be practiced with other computer system configurations such as handheld devices, multiprocessor systems, programmable consumer electronics, minicomputers, and mainframe computers.

Figure 2:
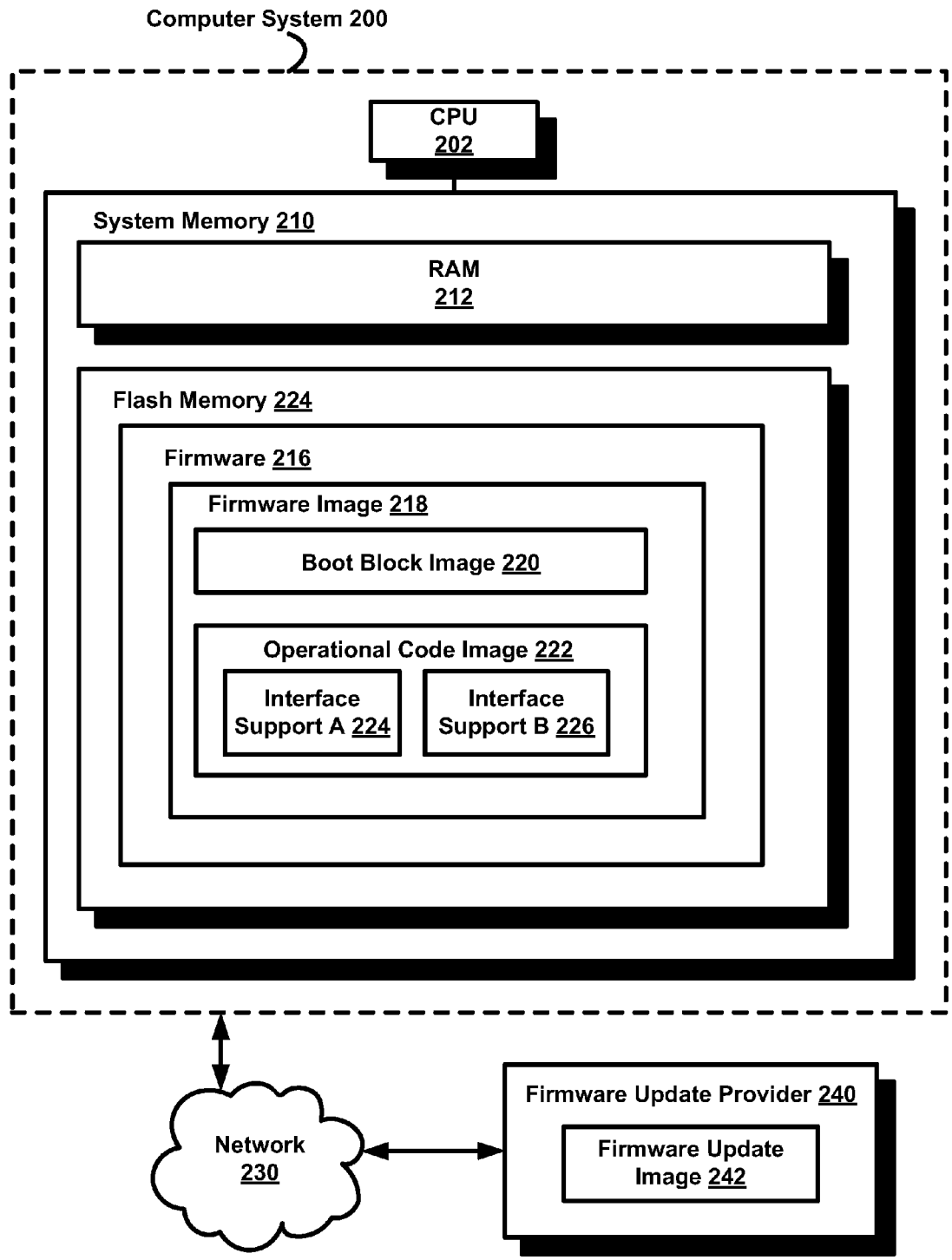
FIG. 2 shows schematically a system memory device having stored computer-executable data for updating firmware of a computer system, according to one embodiment of the present invention.

In one embodiment, the system memory device 120 of the computer system 110 includes a RAM 122 and a ROM 124, where the ROM 124 has stored boot block data (see for example data image 220 in FIG. 2) and stored operational code data (see for example data image 222 in FIG. 2). The boot block data 220 contains computer-executable instructions which, when executed by the processor 112 of the computer system 110, perform functions that include initializing the firmware 125 and then determining if the operational code data 222 is valid. The functions also include copying the operational code data 222 from the ROM 124 to the RAM 122, if it is determined that the operational code data 222 is valid.

The operational code data 222 contains computer-executable instructions which, when executed by the processor 112 of the computer system 110, perform functions that include enabling a plurality of different interface platforms (see, for example, "Interface Support A" 224 and "Interface Support B" 226 in FIG. 2) to receive a firmware update 152 from a firmware update provider 150. The firmware update provider 150 may be a management computer system coupled to the computer system 110 through a network (see, for example network 140), or may be an update client/agent program module. The operational code data 222 is configured to be executable by the processor 202 only from the RAM 212 and the boot block data 220 is configured to be executable by the processor 202 only from the ROM 124. In this embodiment, the operational code data 222 has addresses fixed to be run RAM 212 and the boot block data 220 has the addresses fixed to run from ROM 124. This allows for the ROM 124 to be updated during run-time, while also supporting more than one interface through which the firmware update can be performed.

If, according to the functions executed by the processor 112 ROM 124 the boot block data 220, it is determined that the operational code data 222 is not valid, the functions further include causing a particular one of the plurality of enabled interface platforms 224, 226 to wait for an available firmware update 152 and, when a firmware update 152 is available, receiving the firmware update 152 from 124 the firmware update provider 150. In the embodiment of FIG. 1, the firmware update 152 includes at least one of updated boot block data and updated operational code data.

If the operational code data 222 is not valid and a firmware update 152 has been received, the functions further include determining if the received firmware update 152 is valid. If it is determined that the received firmware update 152 is valid, the functions further include writing the firmware update 152 to the ROM 124. Writing the firmware update 152 to ROM 124 includes determining if the received firmware update 152 includes updated boot block data and/or updated operational code data and, if the received firmware update 152 has updated boot block data, writing the updated boot block data to the ROM 124 such as to replace the prior boot block data 220. The function of writing the firmware update 152 to the ROM 124 also includes, if the received firmware update 152 has updated operational code data, writing the updated operational code data to the ROM 124 such as to replace the prior operational code data 222. The functions performed according to the computer-executable instructions of the boot block data 220 further include, if the received firmware update 152 has updated boot block data but does not have updated operational code data, resetting the firmware 125.

As further shown by FIG. 1, in one embodiment the system memory device 120 is coupled to a network 140 such as a LAN or WAN using TCP/IP protocol, and is operative to receive the firmware update 152 via the network 140. The computer system 110 also includes a network interface 126 coupled to the network 140 and coupled to the system memory device 120. The network interface 126 is operative to receive the firmware update 152 from the firmware update provider 150 via the network 140. The network interface 126 is further operative to send the received firmware update 152 to the system memory device 120. In this embodiment, the particular one of the plurality of enabled interface platforms 224, 226 corresponds to the network interface 126, and the functions performed according to the computer-executable instructions of the boot block data 220 further include causing the particular interface platform to receive the firmware update 152 sent from the network interface 126.

In the embodiment shown in FIG. 1, the computer system 110 also includes a mass storage device 114 having a stored operating system 116 and a stored network application 118.

The operating system 116 is suitable for controlling the operation of the computer system 110 and may be the WINDOWS XP® operating system from MICROSOFT CORPORATION® of Redmond, Wash. or the LINUX operating system. As shown, the mass storage device 114, which may be a hard disk drive, is connected to the network interface 126. The network application 118 may be a Web browser application such as the INTERNET EXPLORER® browser program from MICROSOFT CORPORATION®.

The computer system 110 further includes an input-output controller 128 and a display device 130, where the input-output controller 128 is coupled to the mass storage device 114 and the display device 130. The input-output controller 128 may include one or more of a video adapter for displaying graphics on the display device 130, and a user interface card for receiving user input from a user, such as through a keyboard and mouse or other form of user input device. Those skilled in the art will appreciate that the computer system 110 may further include a system bus (not shown) that operatively couples the system memory device 120 to the processor 112.

Now referring to the exemplary embodiment shown in FIG. 2, in another aspect, the present invention relates to a computer system 200 having a processor 202, a system memory 210, and a firmware 216. As described above with reference to the computer system 110 of FIG. 1, although the computer system 200 of FIG. 2 is directed to the context of a personal computer or server computer, those skilled in the art will appreciate that aspects of the present invention may also be practiced with other computer system configurations such as handheld devices, multiprocessor systems, programmable consumer electronics, minicomputers, and mainframe computers.

As shown, the system memory 210 includes a RAM 212 and a flash memory 214 which has a stored firmware image 218 with a boot block image 220 in a first memory location and a stored operational code image 222 in a second memory location. The boot block image 220 contains computer-executable instructions which, when executed by the processor 202, perform functions that include initializing the firmware 216, determining if the operational code image 222 is valid, and if the operational code image 222 is valid, copying the operational code image 222 from the flash memory 214 to the RAM 212. The functions further include, if it is determined that the operational code image 222 is not valid, waiting for an available firmware update image 242 and, when a firmware update image 242 is available, receiving the firmware update image 242 from a firmware update image provider 240. The firmware update image provider 240 may be a management computer system coupled to the computer system 200 through a network (see, for example network 230), or may be an update client/agent program module. In the embodiment shown in FIG. 2, the firmware update 242 image contains an updated boot block image and/or an updated operational code image.

The functions performed according to the instructions stored on the boot block image 220 further include, if the operational code image 222 is not valid and a firmware update image 242 has been received, determining whether the received firmware update image 242 is valid. If the received firmware update image 242 is valid, the functions further include flashing the firmware update image 242 to the flash memory 214 such as to replace the prior firmware image 218.

In one embodiment, the function of flashing the firmware update image 242 includes determining if the received firmware update image 242 has an updated boot block image and/or an updated operational code image. If it is determined that the received firmware update image 242 has an updated boot block image, the functions also include flashing the updated boot block image to the flash memory 214 such as to replace the prior boot block image 220 stored in the first memory location, and such as to form a single binary image from the operational code image 222 and the updated boot block image. If it is determined that the received firmware update image 242 has an updated operational code image, the functions further include flashing the updated operational code image to the flash memory 214 such as to replace the prior operational code image 222 stored in the second memory location and such as to form a single binary image from the boot block image 220 and the updated operational code image. The functions performed also include, if the received firmware update image 242 has an updated boot block image but does not have an updated operational code image, resetting the firmware 216 after the updated boot block image is flashed to the flash memory 214.

In one embodiment, the computer system 200 is connected to a network 230, such as a LAN or WAN using TCP/IP protocol, and is operative to receive the firmware update image 242 via the network 230.

The operational code image 222 is configured to be executable by the processor 202 only from the RAM 212 and the boot block image 220 is configured to be executable by the processor 112 only from the flash memory 214, which in operation allows for the flash memory 224 to be updated during run-time, while also supporting various interfaces through which the firmware update can be performed.

Figure 3A:
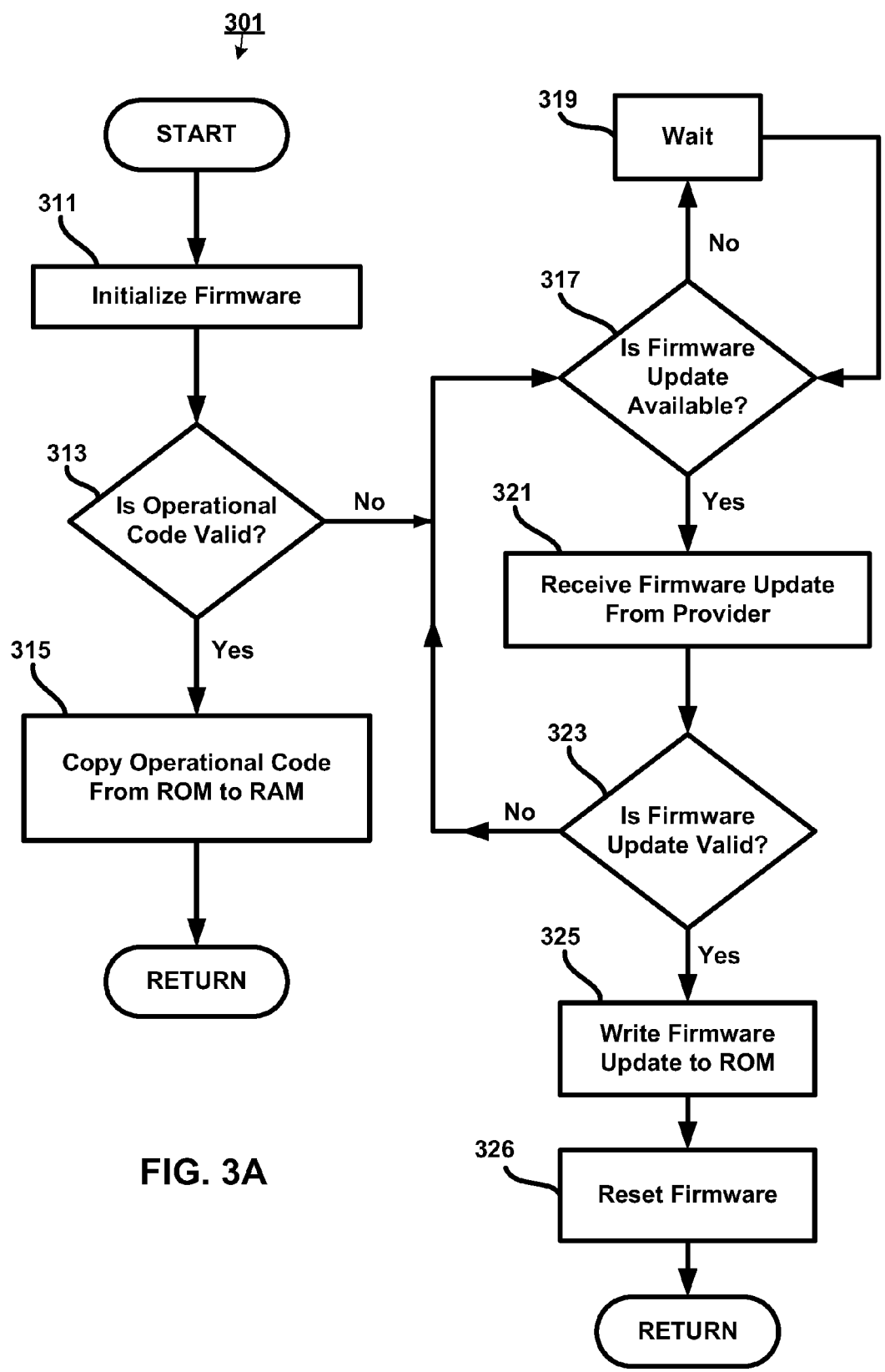
FIG. 3A shows a flow chart illustrating operational steps of a computer-executable function performed according to instructions contained in boot block data, according to one embodiment of the present invention.
Figure 3B:
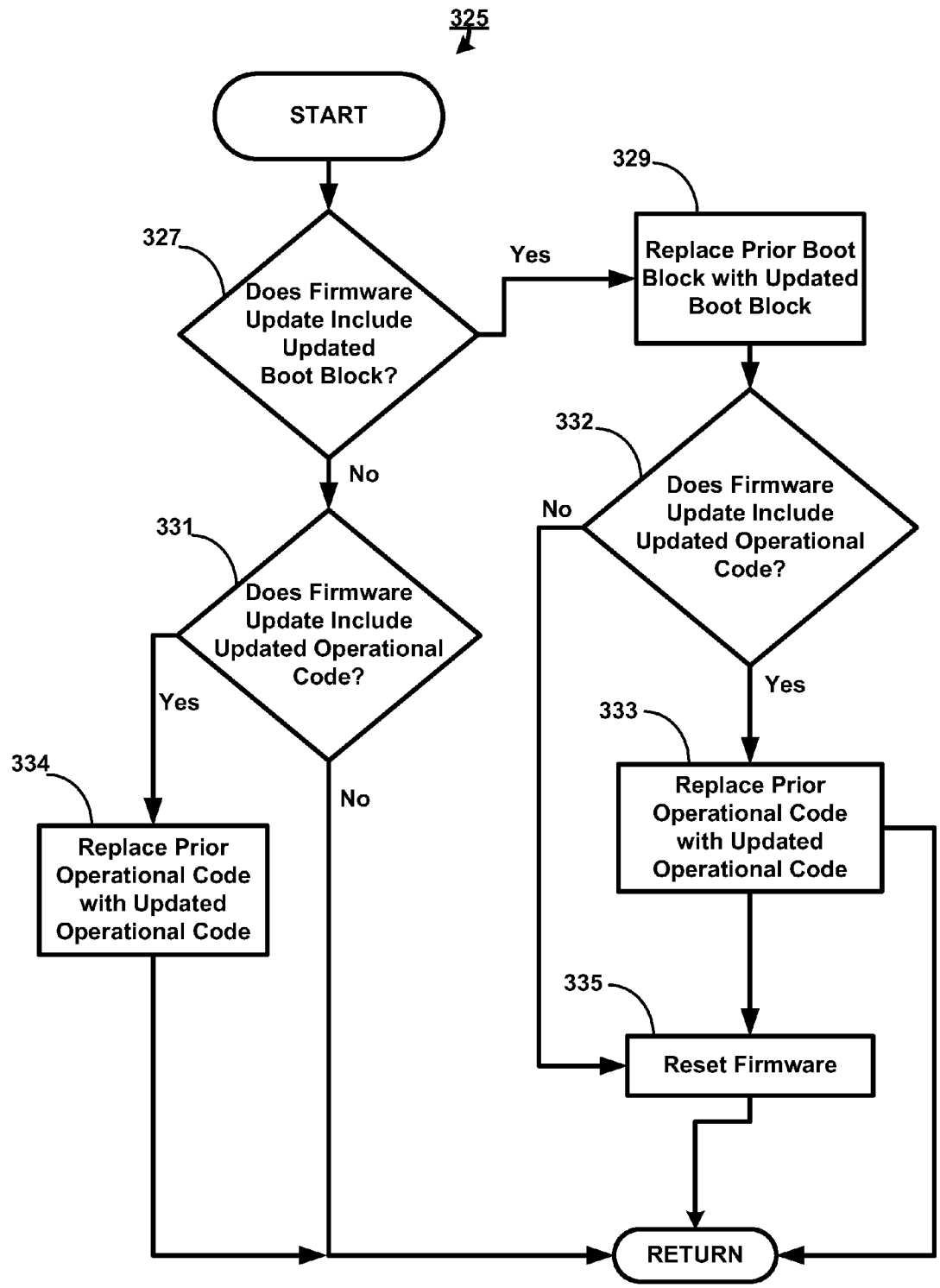
FIG. 3B shows a flow chart illustrating in further detail a particular operational step of the computer-executable function shown in FIG. 3A, according to one embodiment of the present invention.

Now referring to FIG. 3A and FIG. 3B, in yet another aspect, the present invention relates to a computer-implemented method 301 for updating a firmware within a computer system having a system memory device and a processor. In one embodiment, the method includes the steps of initializing the firmware (step 311), determining if an operational code data is valid (step 313), where the operational code data is stored in a ROM within the system memory device, and if the operational code data is valid, copying the operational code data from the ROM to a random-access memory RAM within the system memory (step 315). The operational code data is operative to enable a plurality of different interface platforms to receive a firmware update from a firmware update provider. The computer implemented 301 also includes the steps of, if the operational code data is not valid, waiting for an available firmware update (step 319) and, when a firmware update is available, receiving the firmware update from the firmware update provider (step 321). If the operational code data is not valid and a firmware update has been received, the computer-implemented method further includes the step of determining if the received firmware update is valid (step 323) and, if the received firmware update is valid, writing the firmware update to the ROM (step 325).

Now referring also to FIG. 3B, in one embodiment, the step 325 of writing the firmware update to the ROM includes the steps of determining if the received firmware update has updated boot block data (step 327), and if the received firmware update has a updated boot block data, writing the updated boot block data to the ROM such as to replace the prior boot block data (step 329). The step 325 also includes the steps of determining if the received firmware update has updated operational code data (step 331) and, if the received firmware update has updated operational code data, writing the updated operational code data to the ROM such as to replace the prior operational code data (step 333). The step 325 also includes the step 335 of, if the received firmware update includes updated boot block data but not updated operational code data, resetting the firmware after the updated boot block data is written to the ROM.

In one embodiment, the operational code data is configured to be executable by the processor only from the RAM and the boot block data is configured to be executable by the processor only from the ROM.

In yet another aspect, the present invention relates to a computer-readable medium having stored computer-executable instructions which, when executed by a processor, perform functions for updating a firmware within a computer system having a system memory device. In one embodiment, the functions include initializing the firmware and determining if operational code data is valid. The operational code data is stored in a ROM within the system memory device. The functions also include, if the operational code data is determined to be valid, copying the operational code data from the ROM to a RAM within the system memory where the operational code data is operative to enable a plurality of different interface platforms to receive a firmware update from a firmware update provider. The functions also include, if it is determined that the operational code data is not valid, waiting for an available firmware update and, when a firmware update is available, receiving the firmware update from the firmware update provider.

In one embodiment, the functions further include, if the operational code data is not valid and a firmware update has been received, determining if the received firmware update is valid, and, if the received firmware update is valid, writing the firmware update to the ROM. The function of writing the firmware update to the ROM includes determining if the received firmware update contains updated boot block data and, if the received firmware update contains updated boot block data, writing the updated boot block data to the ROM such as to replace the prior boot block data. The function of writing the firmware update to the ROM also includes determining if the received firmware update includes updated operational code data and, if the received firmware update includes updated operational code data, writing the updated operational code data to the ROM such as to replace the prior operational code data. The function of writing the firmware update to the ROM also includes, if the received firmware update contains updated operational code data, resetting the firmware after the updated boot block data is written to the ROM.

In one embodiment, the operational code image is configured to be executable by the processor only from the RAM and the boot block image is configured to be executable by the processor only from the ROM.

In one or more embodiments it is not required for a firmware update to be provided only when operational code is invalid. The firmware can be updated with an updated boot block and operational code when a new feature is available from a third party developer of manufacturer, for example.

Further, in one or more embodiments of the present invention, when an operational code is invalid, the boot block still has only one interface available, as it is running from ROM. However, redundant images of operational code can be implemented, with one image serving as a valid backup image that is not subject to upgrades and that may be run from RAM if other active operational code becomes invalid.

"Computer-readable medium" may be any of or a combination of volatile and non-volatile, removable and non-removable media for storage of information such as computer-executable instructions, data structures or program modules, which may be RAM, ROM, or flash memory as used in the exemplary embodiments set forth above, or may also or alternatively be EPROM, EEPROM, CD-ROM, DVD, HD-DVD, BLU-RAY, or other optical storage.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system memory device for a computer system, comprising:
   a processor;
   firmware;
   a random access memory (RAM); and
   a read-only memory (ROM) having stored thereon the firmware, wherein the firmware is configured to include boot block data and operational code data,
   wherein the processor is configured to execute the boot block data from the ROM,
   wherein the operational code data comprise computer-executable instructions having fixed addresses of the RAM and which, when executed by the processor, cause the processor to perform functions including enabling a plurality of different interfaces each to receive a firmware update from a firmware update provider,
   wherein the boot block data comprise computer-executable instructions having fixed addresses of the ROM and which, when executed by the processor, cause the processor to perform functions including
      executing code data at a fixed address of the RAM;
      determining if the operational code data are valid; and in response to determining that the operational code data are valid, copying the operational code data from the ROM to the RAM at the fixed address of the RAM such that the boot block data are able to cause the processor to execute the operational code data; and in response to determining that the operational code data are not valid, causing a particular one of the plurality of enabled interfaces to wait for an available firmware update and, when a firmware update is available, receiving the firmware update from the firmware update provider.

2. The system memory device of claim 1, wherein the firmware update comprises at least one of updated boot block data and updated operational code data.

3. The system memory device of claim 1, wherein the functions performed according to the computer-executable instructions of the boot block data further comprise, if the operational code data is not valid and a firmware update has been received, determining if the received firmware update is valid.

4. The system memory device of claim 3, wherein the functions performed according to the computer-executable instructions of the boot block data further comprise, if the received firmware update is valid, writing the firmware update to the ROM.

5. The system memory device of claim 4, wherein the function of writing the firmware update comprises:
(a) determining if the received firmware update comprises updated boot block data or updated operational code data;
(b) if the received firmware update comprises updated boot block data, writing the updated boot block data to the ROM such as to replace the prior boot block data; and
(c) if the received firmware update comprises updated operational code data, writing the updated operational code data to the ROM such as to replace the prior operational code data.

6. The system memory device of claim 1, wherein the operational code data is configured to be executable by the processor only from the RAM and the boot block data is configured to be executable by the processor only from the ROM.

7. The system memory device of claim 1, wherein the system memory device is coupled to a network and is operative to receive the firmware update via the network.

8. The system memory device of claim 1, wherein the plurality of different interfaces comprise at least one of KCS, LAN, and IPMB.

9. The system memory device of claim 1, wherein the computer system further comprises a network interface coupled to the network and coupled to the system memory device, wherein the network interface is operative to receive the firmware update from the firmware update provider via the network.

10. The system memory device of claim 9, wherein the network interface is further operative to send the received firmware update to the system memory device.

11. The system memory device of claim 10, wherein the particular one of the plurality of enabled interfaces corresponds to the network interface, and wherein the functions performed according to the computer-executable instructions of the boot block data further comprise causing the particular interface platform to receive the firmware update sent from the network interface.

12. The system memory device of claim 10, wherein the computer system further comprises a mass storage device coupled to the network interface and having stored thereon an operating system and a network application.

13. The system memory device of claim 12, wherein the computer system further comprises an input-output controller and a display device, wherein the input-output controller is coupled to the mass storage device and the display device.

14. A computer system, having a processor, a system memory, and firmware, the system memory comprising:
a random access memory (RAM); and
a flash memory having stored thereon a firmware image comprising a boot block image in a first memory location and an operational code image in a second memory location, wherein the processor is configured to execute the boot block image from the flash memory,
wherein the operational code image comprises computer-executable instructions having fixed addresses of the RAM, and
wherein the boot block image comprises computer-executable instructions having fixed addresses of the flash memory and which, when executed by the processor, cause the processor to perform functions comprising:
executing code data at a fixed address of the RAM;
determining if the operational code image is valid;
in response to determining that the operational code image is valid, copying the operational code image from the flash memory to the RAM at the fixed address of the RAM such that the boot block image is able to cause the processor to execute the operational code image; and
in response to determining that the operational code image is not valid, waiting for an available firmware update image and, when a firmware update image is available, receiving the firmware update image from a firmware update image provider.

15. The computer system of claim 14, wherein the firmware update image comprises at least one of an updated boot block image and an updated operational code image.

16. The computer system of claim 14, wherein the functions performed further comprise, if the operational code image is not valid and a firmware update image has been received, determining whether the received firmware update image is valid.

17. The computer system of claim 16, wherein the functions performed further comprise, if the received firmware update image is valid, flashing the firmware update image to the flash memory such as to replace the prior firmware image.

18. The computer system of claim 17, wherein the function of flashing the firmware update image comprises:
(a) determining if the received firmware update image comprises at least one of an updated boot block image and an updated operational code image;
(b) if the received firmware update image comprises an updated boot block image, flashing the updated boot block image to the flash memory such as to replace the prior boot block image stored in the first memory location, and such as to form a single binary image from the operational code image and the updated boot block image; and
(c) if the received firmware update image comprises an updated operational code image, flashing the updated operational code image to the flash memory such as to replace the prior operational code image stored in the second memory location and such as to form a single binary image from the boot block image and the updated operational code image.

19. The computer system of claim 14, wherein the operational code image is configured to be executable by the processor only from the RAM and the boot block image is configured to be executable by the processor only from the flash memory.

20. The computer system of claim 14, wherein the computer system is connected to a network and is operative to receive the firmware update image via the network.

21. A computer-implemented method for updating a firmware within a computer system having a system memory device and a processor, comprising:
   executing, at the processor, boot block data from a read-only memory (ROM) within the system memory device, wherein the boot block data comprise computer-executable instructions having fixed addresses of the ROM;
   executing code data at a fixed address of a random-access memory (RAM) within the system memory;
   determining if operational code data are valid, wherein the operational code data are stored in the ROM; and
   in response to determining that the operational code data are valid, copying the operational code data from the ROM to the RAM at the fixed address of the RAM such that the boot block data are able to cause the processor to execute the operational code data, wherein the operational code data comprise computer-executable instructions having fixed addresses of the RAM and are operative to enable a plurality of different interfaces to receive a firmware update from a firmware update provider; and
   in response to determining that the operational code data are not valid:
      waiting for an available firmware update; and
      when a firmware update is available, receiving the firmware update from the firmware update provider.

22. The computer-implemented method of claim 21, further comprising, if the operational code data is not valid and a firmware update has been received, determining if the received firmware update is valid.

23. The computer implemented method of claim 22, further comprising, if the received firmware update is valid, writing the firmware update to the ROM.

24. The computer-implemented method of claim 23, wherein writing the firmware update to the ROM comprises:
   (a) determining if the received firmware update comprises updated boot block data;
   (b) if the received firmware update comprises updated boot block data, writing the updated boot block data to the ROM such as to replace the prior boot block data;
   (c) determining if the received firmware update comprises updated operational code data; and
   (d) if the received firmware update comprises updated operational code data, writing the updated operational code data to the ROM such as to replace the prior operational code data.

25. The computer-implemented method of claim 24, wherein if the received firmware update comprises updated boot block data and the firmware update does not comprise operational code data, resetting the firmware after the updated boot block image is written to the ROM.

26. The computer-implemented method of claim 21, wherein the plurality of different interfaces comprise at least one of KCS, LAN, and IPMB.

27. The computer-implemented method of claim 21, wherein the operational code data is configured to be executable by the processor only from the RAM and the boot block data is configured to be executable by the processor only from the ROM.

28. A computer-readable medium that is a read-only memory (ROM) and having stored thereon computer-executable instructions having fixed addresses of the ROM and which, when executed by a processor, perform functions for updating firmware within a computer system having a system memory device, the functions comprising:
   executing code data at a fixed address of a random-access memory (RAM) within the system memory;
   determining if an operational code data are valid, wherein the operational code data are stored in the ROM; and
   in response to determining that the operational code data are valid, copying the operational code data from the ROM to the RAM at the fixed address of the RAM such that the boot block data are able to cause the processor to execute the operational code data, wherein the operational code data comprise computer-executable instructions having fixed addresses of the RAM and are operative to enable a plurality of different interfaces to receive a firmware update from a firmware update provider; and
   in response to determining that the operational code data are not valid:
      waiting for an available firmware update; and
      when a firmware update is available, receiving the firmware update from the firmware update provider.

29. The computer-readable medium of claim 28, wherein the functions further comprise, if the operational code data is not valid and a firmware update has been received, determining if the received firmware update is valid.

30. The computer-readable medium of claim 29, wherein the functions further comprise, if the received firmware update is valid, writing the firmware update to the ROM.

31. The computer-readable medium of claim 30, wherein the function of writing the firmware update to the ROM comprises:
   (a) determining if the received firmware update comprises updated boot block data;
   (b) if the received firmware update comprises updated boot block data, writing the updated boot block data to the ROM such as to replace the prior boot block data;
   (c) determining if the received firmware update comprises updated operational code data; and
   (d) if the received firmware update comprises updated operational code data, writing the updated operational code data to the ROM such as to replace the prior operational code data.

32. The computer-readable medium of claim 31, wherein the functions further comprise, if the firmware comprises updated boot block data and the firmware does not comprise updated operational code data, resetting the firmware after the updated boot block data is written to the ROM.

33. The computer-readable medium of claim 28, wherein the plurality of different interfaces comprise at least one of KCS, LAN, and IPMB.

34. The computer-readable medium of claim 28, wherein the operational code image is configured to be executable by the processor only from the RAM and the boot block image is configured to be executable by the processor only from the ROM.

* * * * *